G. C. CLARK.
Horse Potato Fork.

No. 201,652.  Patented March 26, 1878.

WITNESSES:
Chas. Nida
Alex F. Roberts

INVENTOR:
G. C. Clark
BY Munn &co
ATTORNEYS.

UNITED STATES PATENT OFFICE.

GEORGE C. CLARK, OF FREEHOLD, NEW YORK.

IMPROVEMENT IN HORSE POTATO-FORKS.

Specification forming part of Letters Patent No. 201,652, dated March 26, 1878; application filed August 11, 1877.

*To all whom it may concern:*

Figure 1:
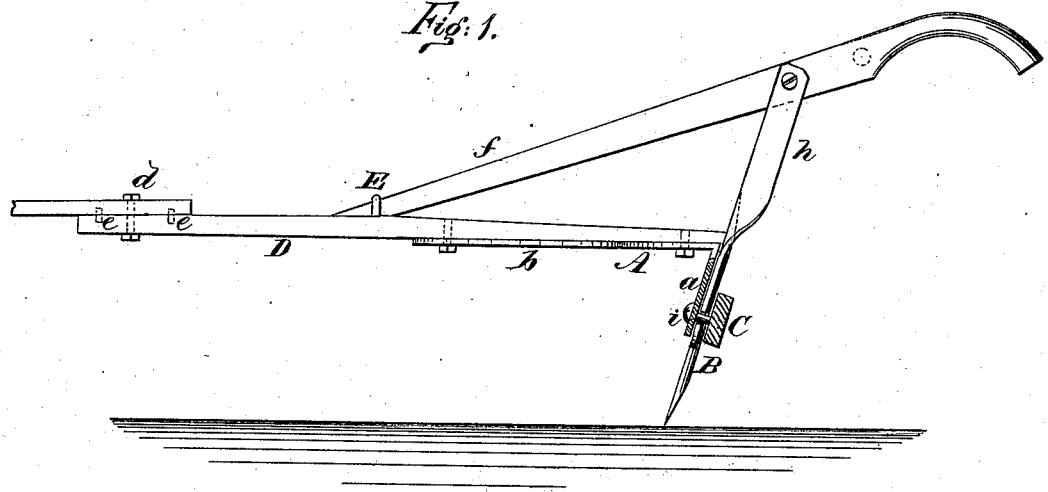
Figure 2:
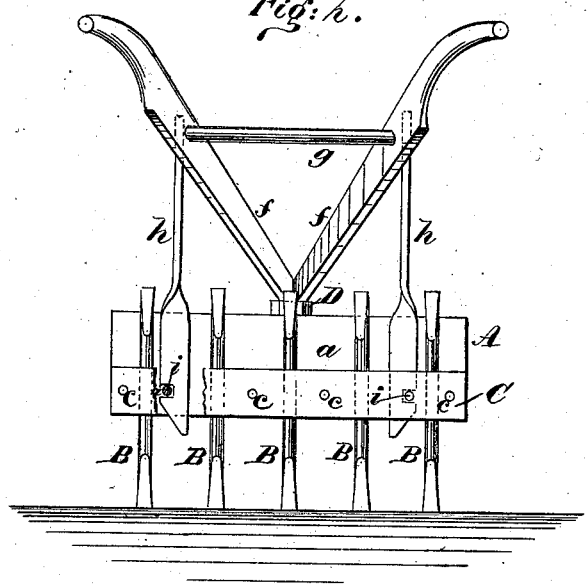

Be it known that I, GEORGE C. CLARK, of Freehold, in the county of Greene and State of New York, have invented a new and Improved Horse Potato-Fork, of which the following is a specification:

Figure 1 is a side elevation in section. Fig. 2 is a rear view, with a portion broken away to show the construction more clearly.

Similar letters of reference indicate corresponding parts.

My invention consists of a head attached to a tongue, and provided with adjustable teeth, and with spring catches or fasteners for securing the handles of the implement to the head.

In the drawing, A is a head, consisting of a plate bent at a suitable angle, the part $a$ being grooved vertically to receive the teeth B, which are clamped thereto by the bar C, which is also grooved to receive the teeth B. Bolts $c$ pass through the bar C and through the part $a$, and draw the two firmly together against the teeth B. The tongue D is bolted to the part $b$ of the head A, and is jointed at $d$, to admit of folding it together upon itself. Dowels $e$ project from one part of the tongue D, one on each side of the bolt that holds the two parts together. These dowels are received by corresponding holes in the opposite part when the tongue is straightened for use. E is a staple, driven into the tongue, for receiving the lower ends of the handles $f$. These handles are provided with the usual round $g$, and to each handle a spring-catch, $h$, is jointed, which engages a bolt, $i$, that passes through the part $a$ of the head A when the handles are attached. There is a notch in the upper surface of the handles, near their lower ends, which receives the staple E.

The handles are applied to the implement by placing their notched ends under the staple E, and pressing down upon the upper or outer ends until the catches $h$ engage the bolts $i$.

The teeth B consist of steel bars, which are flattened or chisel-shaped at each end, so that they may be reversed when worn. The teeth are straight on the face side.

The horses are hitched to the tongue in the usual way, and as the fork is drawn forward it is lifted from the ground after raising each hill of potatoes.

This implement, although extremely simple, is more efficient than the more costly and complicated machines.

Having thus described my invention, I claim as new and desire to secure by Letters Patent—

A horse potato-fork, consisting of angle-bar A, teeth B, clamp-bar C, handles $f$, and supports $h$, all connected and relatively arranged, substantially as shown and described.

GEORGE C. CLARK.

Witnesses:
  GEO. M. HOPKINS,
  ALEX. F. ROBERTS.